J. B. GRAHAM.
MEANS FOR AND METHOD OF FLOWING GLASS.
APPLICATION FILED JUNE 14, 1917.
1,353,907.
Patented Sept. 28, 1920.
3 SHEETS—SHEET 3.
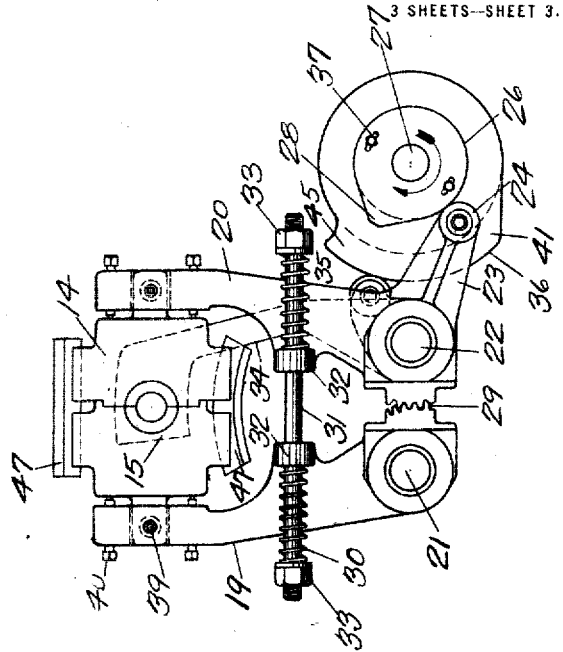
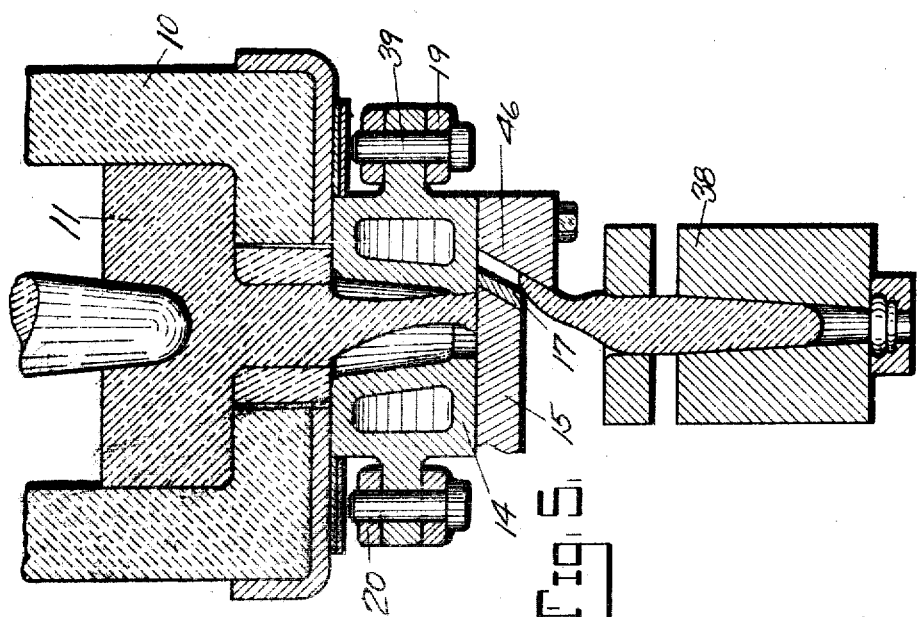
INVENTOR.
Joseph B. Graham
By J. F. Rule
His attorney

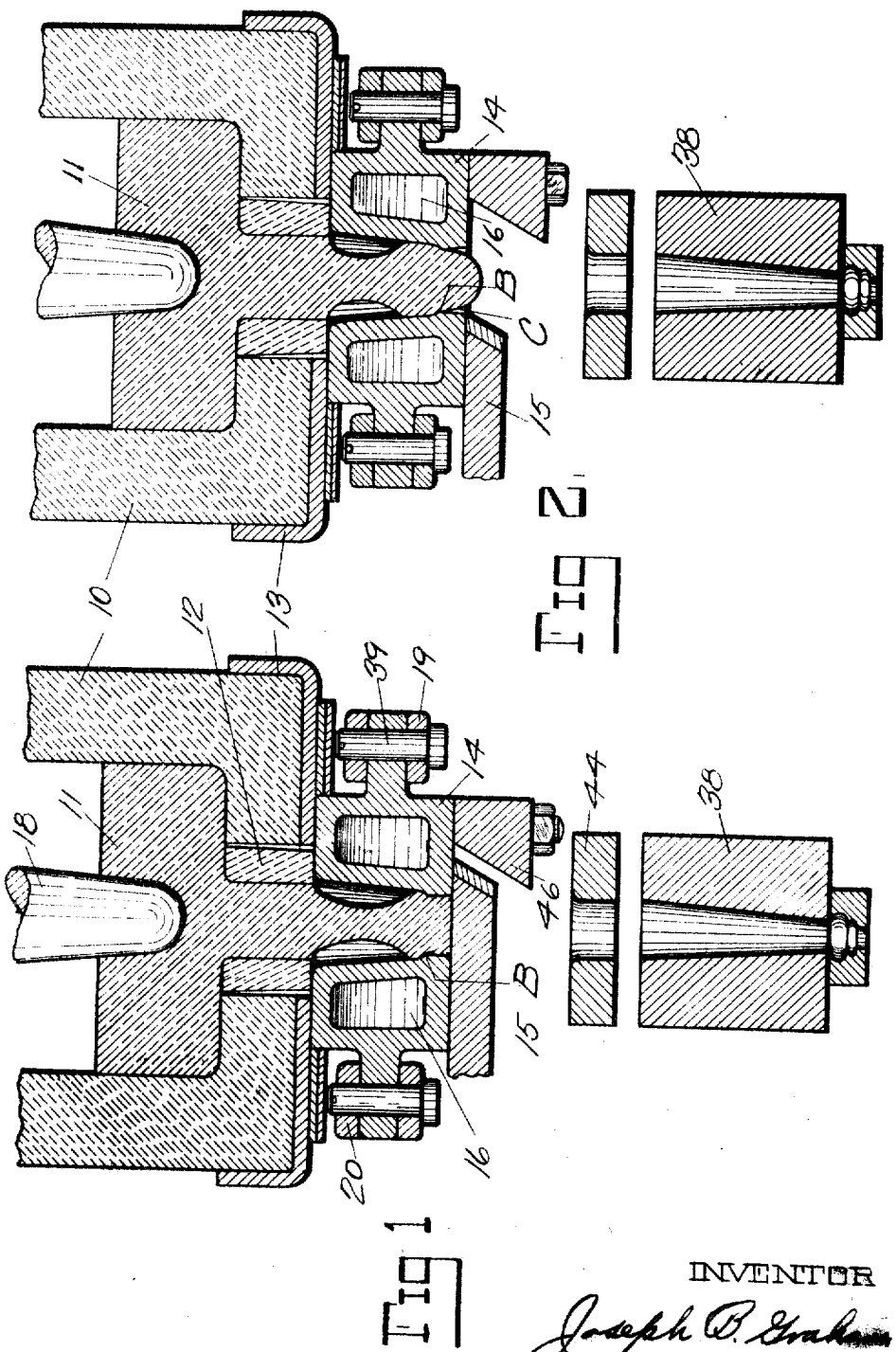

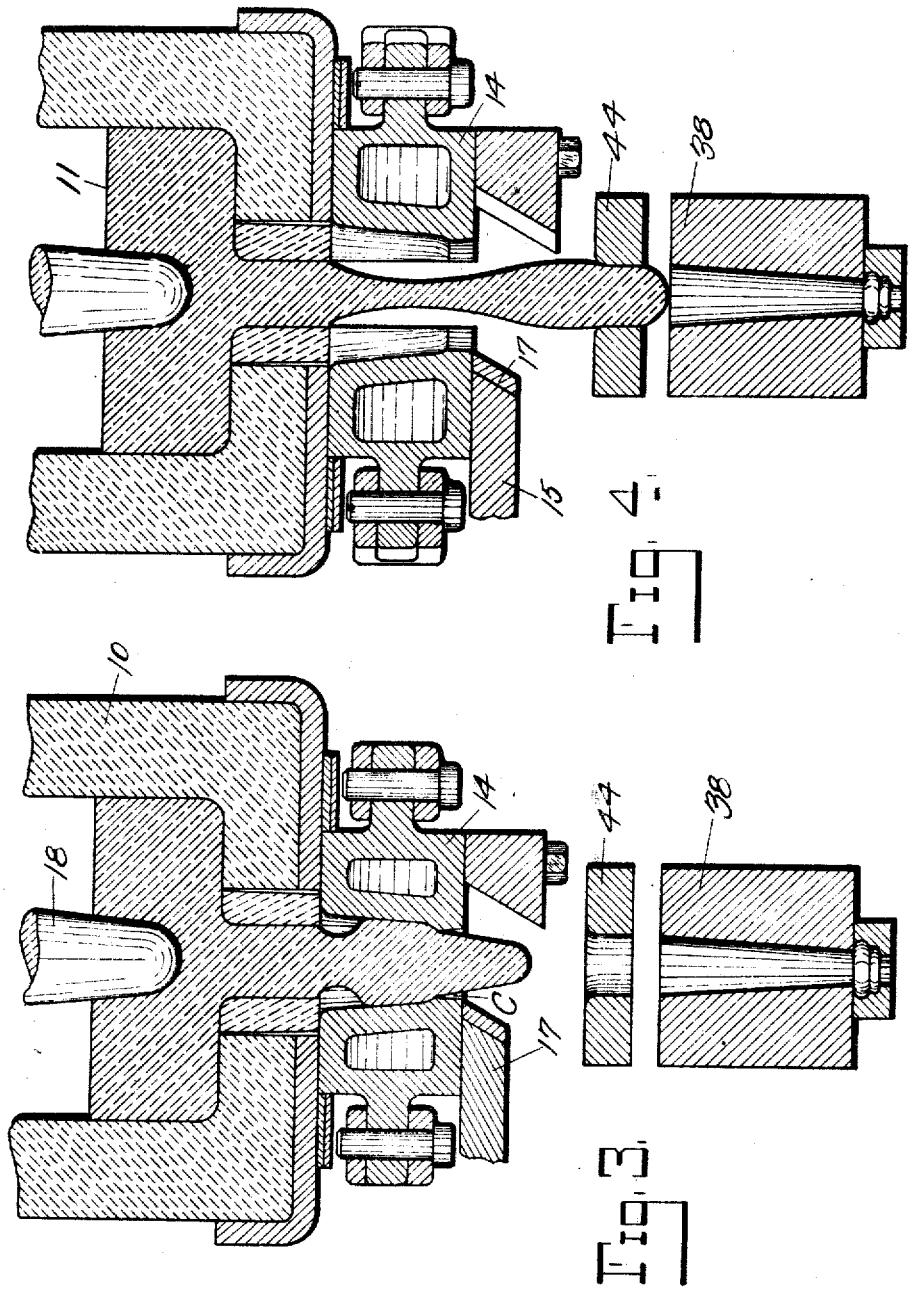

UNITED STATES PATENT OFFICE.

JOSEPH B. GRAHAM, OF EVANSVILLE, INDIANA, ASSIGNOR TO THE OWENS BOTTLE MACHINE COMPANY, OF TOLEDO, OHIO, A CORPORATION OF OHIO.

MEANS FOR AND METHOD OF FLOWING GLASS.

1,353,907.   Specification of Letters Patent.   Patented Sept. 28, 1920.

Application filed June 14, 1917. Serial No. 174,697.

*To all whom it may concern:*

Be it known that I, JOSEPH B. GRAHAM, a citizen of the United States, residing at Evansville, in the county of Vanderburg and State of Indiana, have invented new and useful Improvements in Means for and Methods of Flowing Glass, of which the following is a specification.

This invention relates to a method of and means for manipulating glass and more particularly to a method and mechanism for gathering and segregating a flowing stream of molten glass into individual gathers or masses to be transferred to forming molds.

It is desirable to have the glass as it flows from the tank at a comparatively high temperature because the highly fluid glass will make better ware, and also because it flows faster and much more freely at a high temperature. When using the highly fluid glass it needs to be chilled or cooled to a certain extent before it is in proper condition to go into the blank mold. Such chilling, however, should not be much greater at one point than another or else it will produce defects in the ware.

It is old in the glass making art to establish a flowing stream of molten glass from a furnace or pot and permit it to accumulate in a temporary receptacle, the mass being then transferred into molds in which the glass is shaped. In handling the glass in this manner, as heretofore practised, it is unevenly cooled, thereby preventing the article from being properly formed in the mold, and thus producing defects which appear in the finished article. This is particularly noticeable in the scar produced by the cut-off device which forms a temporary bottom for the receptacle and remains in contact with the glass during the entire time the gob is accumulating, so that the surface of the glass in contact with the cut-off device is unduly chilled. The glass in the lower part of the receptacle is also cooled to a materially greater extent than the upper portion of the charge. The effects of the surface of the glass being unevenly chilled and scarred are particularly objectionable in the manufacture of narrow necked bottles and similar ware, and are so serious that it has heretofore been found wholly impractical to make such narrow neck ware from a flowing stream of glass.

An object of the present invention is to overcome the above difficulties by providing a method and means for producing gobs of practically uniform temperature throughout, and further to elongate and form the gob into the best possible shape to enter the blank mold.

To this end the invention provides means whereby a stream of glass may be established and gathered into individual masses or gathers which are temporarily supported in a manner to permit the chilled surfaces to be reheated from the interior of the mass before being dropped or transferred to the forming mold. The glass may flow into a temporary receptacle having a bottom and side walls to support the accumulating mass. As the glass accumulates in the receptacle the bottom is withdrawn. The side walls then form a temporary support preventing the glass from immediately dropping through the lower open end of the receptacle. The lower surface of the mass which has been chilled to some extent by said bottom is quickly reheated from the interior of the mass. At the same time the soft glass commences to sag or elongate downward through the bottom of the receptacle, tending to produce a pear shaped or rounded mass. The outer layer or skin of glass on the exposed surface, owing to the increased area of the surface, is thus attenuated, thereby materially aiding in reheating the glass and overcoming the cooling effect which has been produced by temporary contact with said removable bottom.

The extent to which the bottom surface of the mass has been chilled is also comparatively small, owing to the fact that the removable bottom is withdrawn before the entire mass has accumulated, and is therefore in contact with the glass only a short time. The lateral supporting surfaces of the receptacle are formed to aid in temporarily supporting the mass of glass, and for this purpose are preferably inclined or flared upwardly and outwardly, forming a wedge shaped or inverted frusto-conical supporting surface for the mass.

The action of the glass when the mold bottom is withdrawn, consists in a continued flow or movement of the glass through the center of the accumulated mass while the outer or side portions of the mass are arrested by the tapered walls of the receptacle. These walls extract a certain amount of heat from the exterior portion of the mass, which renders said portion less fluid and aids in arresting it while there is a continued interior movement of the glass. This causes the glass to accumulate at the top and bottom of the mass simultaneously.

In order to permit the reheating of the lower portions of the lateral surfaces also of the mass, which have been in contact with the side walls of the receptacle as the gather commences to accumulate therein, the lower portions of said side walls are made substantially vertical or may be inclined downwardly and outwardly. As a result, when the bottom of the receptacle is withdrawn and the mass of glass commences to sag or pull downward, the surface thereof is drawn away from the said lower portions of the side walls, thus decreasing the diameter of the glass at the bottom of the cup and materially increasing the area of the glass surface which is free to be reheated. This arrangement tends to produce a substantially uniform temperature throughout the mass at the time it is dropped into the forming mold. With the usual form of divided cup, the lower portion of the charge of glass is cooled to a much lower temperature than the upper portion while in the cup, owing to its being kept in contact with the walls of the cup and cut-off device for a comparatively long time. This difficulty is overcome in the present invention by preventing excessive cooling of the lower portion of the mass and causing the surface thereof to be reheated as above explained.

The accumulating mass of glass is temporarily supported in the receptacle after the removable bottom is withdrawn but would after a brief interval slide through the bottom opening en masse. However, to assist in the discharge of the mass at the proper moment the receptacle is preferably made in sections arranged to be separated, allowing the mass to drop into a mold thereneath. Said sections are then brought together again and the sliding bottom returned or moved across the discharge opening of the receptacle as the mass drops therefrom, to thereby sever the latter from the stream of glass and close said opening to permit the accumulation in the receptacle of a succeeding gather.

By the above method the gather of glass may be delivered to a mold in suitable condition for forming the neck end of a narrow necked bottle and the latter is readily and accurately molded without producing the scars or defects which have heretofore rendered it impossible to satisfactorily form narrow necked ware from a flowing stream of glass.

The invention further comprehends improved means for actuating and controlling the divided receptacle and sliding bottom, said means comprising cams arranged to effect the timed operation of the several parts. The cams operate in synchronism with a rotary mold table by which a set of molds are successively brought to position to receive the charges of glass.

Other features and advantages of the invention will appear hereinafter.

The present application includes certain features disclosed in my co-pending application, Serial No. 143,002, filed January 12, 1917.

In the accompanying drawings which illustrate an apparatus embodying the principles of my invention, Figure 1 is a sectional elevation showing the receptacle or boot from which the continuous stream of glass is supplied, the cup in which the glass is gathered, and the mold into which the gather is dropped.

Figs. 2, 3, 4 and 5 are similar views showing the positions of parts at different periods in the operation of collecting and discharging a gather of glass into the forming mold.

Fig. 6 is a plan view of the divided cup and cut-off, and the operating means therefor.

The molten glass may be supplied as usual from a continuous melting tank, (not shown) provided with an extension or clay boot 10 into which the molten glass 11 flows. A continuous flow or stream of glass from the boot 10 is established by means of an opening in the bottom thereof, said opening formed in a removable bushing 12. A support 13 of cast iron or other metal is provided for the boot 10. Beneath the bushing 12 is a device 14 formed with a central opening, providing a passageway for the stream of glass, in register with and forming substantially a continuation of the passageway through the bushing 12. Said device 14 also forms in combination with a removable bottom 15 a gathering receptacle or temporary retainer in which the glass is arrested and temporarily supported as it accumulates to form a gather or mass, which is subsequently discharged through the open bottom of the receptacle 14 into a mold therebeneath. The receptacle or cup 14 is preferably sectional or divided into two parts which may be separated after the bottom 15 has been withdrawn, to allow the accumulated mass or gather to drop freely from the receptacle.

The divided cup 14 and removable bottom 15 are in some respects similar to corresponding parts disclosed in the United States patent to Proeger, 1,100,776, June 23, 1914, and have some of the same functions. The principal features of the present invention, however, including the method of and means for preventing the undue chilling or hardening of the lower surface of the accumulating mass of glass, reheating said surface and effecting a substantially uniform cooling of the entire surface of the mass, are not disclosed in the Proeger patent and may be practically carried out with various forms of mechanism which are entirely distinct from the mechanism disclosed in either the present application or that of the Proeger patent.

The sections of the cup 14 may be provided with compartments 16 in which water is circulated for cooling the cup. The bottom of the receptacle 14 provides a shearing edge to coöperate with the blade or shearing edge 17 of the cut-off 15. The flow of the stream from the boot 10 is regulated by a plug 18 made of refractory material, and which is adjustable toward and from the mouth of the opening.

The mechanism for actuating the divided cup 14 and bottom 15 is shown in Fig. 6. The two sections of the cup are carried on arms 19 and 20 mounted to swing horizontally on their pivots 21 and 22. The arm 20 forms part of a bell-crank lever having an arm 23 on which is mounted a roller 24 bearing against a cam 26 on a drive shaft 27. As the cam rotates, the high part 28 engages the roll 24 and swings the bell-crank 23, 20 to open the cup 14. Intermeshing gear segments 29 transmit the motion to the arm 19. The cup is closed by means of springs 30 mounted on a rod 31 extending freely through lugs 32 on the arms 19 and 20. The springs are confined between said lugs and nuts 33, the latter adjustable to regulate the tension of the springs.

The swinging bottom 15 is carried by a bell-crank lever 34 pivoted at 22 and having a roll 35 to bear against a cam 36 for swinging said bottom. The cam 36 is also rotated by the shaft 27. Adjusting means 37 permits the relative position of the cams to be adjusted to thereby time the relative movements of the cup and cut-off. The shaft 27 is driven by or in synchronism with a rotary mold table of a glass forming machine carrying a series of molds 38. The molds are brought *seriatim* into position beneath the cup to receive a charge. The cup sections are connected to the arms 19, 20 by pivots 39, and held at the proper angle by adjusting screws 40 which permit accurate adjustment of the abutting faces of the cup sections. Stationary supports 47 are provided for the cup sections.

The operation will be understood from the following description. As shown in Figs. 1 and 6, the cup is closed and the bottom 15 in position to support the accumulating mass of glass. The cams (Fig. 6) are rotating in the direction indicated by the arrow. As the cam 36 runs off the roll 35 at the point 41, the bottom 15 is swung out by a spring (not shown) to the Fig. 2 position. The accumulating mass, however, instead of dropping at once from the receptacle is temporarily supported by the side walls thereof. To enable the glass to be thus supported these walls are inclined upwardly and outwardly from the point B, providing a compartment having the shape of an inverted frustum of a cone, in which the glass is wedged and thus temporarily held. The lower portion of the inclined walls may be curved inwardly as shown to form something of a shoulder at the point B, thereby aiding in supporting the glass. The molten glass, however, immediately upon the withdrawal of the bottom 15 commences to sag or draw downwardly through and beyond the open bottom of the receptacle, as indicated in Fig. 2.

The bottom 15 while in closed position cools the contacting surface of the glass to a certain extent, tending to produce a thin surface layer of chilled or hardened glass, but as the said bottom is withdrawn before the accumulation of glass has proceeded very far, this cooling effect is comparatively slight. After the bottom is withdrawn the cooled surface is reheated and softened by the heat from the interior of the mass. Owing to the area of said surface being greatly extended, the chilled layer of glass is attenuated or drawn out and the reheating thus facilitated. There is also a tendency for said cooled surface to be spread or carried to the sides of the mass as the heated glass tends to flow or break through the bottom of the mass. The sagging of the glass below the open bottom of the cup is caused by the central flow of the comparatively hot liquid glass through the outer layer which has been cooled by contact with the walls of the cup. The lower end of the gob thus-formed is as hot as the portion within the cup, and thus in the best condition for entering the neck end of the mold.

In order to further reduce and counteract the chilling or cooling of the surface of the glass by its contact with the lower interior walls of the receptacle 14, the downward direction of said walls from the point B is changed or deflected outwardly from the general direction of said walls above the point B. This lower portion of the lateral walls may be substantially vertical or more or less inclined or flared downwardly and outwardly. As a result of this arrangement the mass of glass as it sags downward through the open end of the receptacle is drawn inwardly more or less, leaving a space C between the glass and the lower side walls. The surface of the glass which is thus separated from the walls is thereby given opportunity to be reheated from the interior of the mass. It will thus be seen that the cooling effect of said side walls is overcome, first, by shortening the time that the glass is in contact with said walls, and second, by permitting the surface of the glass to reheat while the mass is still supported in the receptacle.

By the time the accumulating mass of glass has attained the proportions indicated in Fig. 3, the cam 28 has reached its operating position and separates the sections of the cup 14, allowing the mass to drop through a funnel 44 into the forming mold 38 therebeneath, as indicated in Fig. 4. The cup then closes and the shoulder 45 on the cam 36 swings the cut-off inward to sever the discharged mass from the oncoming stream. The cup sections are brought together just before or simultaneously with the operation of the cut-off (Fig. 5). The parts are thus brought to the Fig. 1 position, completing the cycle of operation. A deflector 46 (Fig. 5) directs the severed end of the charge toward the mold.

It will be observed that with the present invention, practically the entire mass or gob of glass is dropped at once into the mold. This avoids the objectionable overlapping of glass commonly produced by allowing it to run in a stream into the mold.

Although specific reference is made herein to the advantages of the invention in connection with the manufacture of narrow neck ware, it is to be understood that the invention is not limited to such use, and the various advantages pointed out are obtained by its use in the manufacture of other forms of ware.

Modifications may be resorted to within the spirit and scope of my invention.

What I claim is:—

1. Means for separating a flowing stream of glass into individual masses, comprising a receptacle in the path of the flowing stream, said receptacle having a bottom to support the accumulating mass, means to withdraw said bottom and leave the mass supported by the lateral walls of said receptacle while the bottom surface of the mass, cooled by contact with said bottom, is reheated from the interior of the mass, said walls being formed to sustain the mass and prevent it from dropping from the receptacle during said reheating, and means for then releasing said mass from said receptacle.

2. Means for separating a flowing stream of glass into individual masses, comprising a receptacle in the path of the flowing stream, said receptacle having a bottom to support the accumulating mass, means to withdraw said bottom and leave the mass supported by the lateral walls of said receptacle while the bottom surface of the mass, cooled by contact with said bottom, in reheated from the interior of the mass, said walls being formed to sustain the mass and prevent it from dropping from the receptacle during said reheating, said receptacle comprising sections separable to release the mass and permit it to drop from the receptacle, and means to separate said sections after said bottom surface of the glass has become reheated.

3. The combination with a tank or container for molten glass, said tank provided with a bottom opening to permit a stream of molten glass to flow therefrom, of a receptacle beneath the tank in register with said opening and in which the stream of glass accumulates to form a mass or gather, said receptacle comprising side walls and a bottom, means to withdraw said bottom during the accumulation of a mass within the receptacle and leave said mass supported by the side walls of said receptacle while the lower surface of said mass, cooled by contact with said bottom, is reheated from the interior of the mass, said walls being inclined downwardly and inwardly sufficiently to sustain the mass and prevent it from dropping from the receptacle during said reheating, and means to return said bottom when the mass has been discharged through the open bottom of the receptacle and thereby sever said mass from the flowing stream.

4. The combination with a tank or container for molten glass, said tank provided with a bottom opening to permit a continuous stream of molten glass to flow therefrom, of a receptacle beneath the tank in register with said opening and in which the stream of glass accumulates to form a mass or gather, said receptacle comprising side walls and a bottom, means to withdraw said bottom during the accumulation of a mass within the receptacle and cause said mass to be supported by the side walls of said receptacle while the lower surface of said mass, cooled by contact with said bottom, is reheated from the interior of the mass, the lateral walls of said receptacle being upwardly and outwardly inclined or flared and arranged to sustain the weight of the accumulating mass and prevent it from dropping through the receptacle immediately upon the withdrawal of said bottom.

5. The combination with a container from which a stream of glass is supplied, of means for dividing the stream into individual masses, comprising a receptacle separate from the container to temporarily receive and support the accumulating mass, said receptacle having side walls and a removable bottom, means to withdraw said bottom while the mass is accumulating in the receptacle, the side walls of the receptacle being upwardly and outwardly flared or inclined from a point a short distance above the bottom of the receptacle, the form of the receptacle being such that the accumulating mass is sustained therein after the bottom is withdrawn, the direction of the lateral walls below said point being changed outwardly to widen the lower portion of said receptacle, whereby when said bottom is withdrawn, the molten glass while supported by said inclined walls, sags below the bottom of the receptacle and draws away from the lower side walls, permitting the lower surfaces of the mass cooled by contact with said bottom and walls to be reheated from the interior of the mass before the latter is released from said receptacle.

6. The combination with a container from which a stream of glass is supplied, of means for manipulating the stream to form individual masses or gathers, said means comprising a receptacle separate from the container to temporarily support the accumulating mass of glass, said receptacle comprising a bottom and side walls, means for withdrawing said bottom and leaving the mass of glass supported by the side walls of the receptacle, said side walls being upwardly and outwardly inclined from an intermediate point, the form of the receptacle being such that the accumulating mass is sustained therein after the bottom is withdrawn, the form of the walls below said intermediate point being such that as the mass of glass sags or protrudes through the bottom opening of said receptacle, it is withdrawn or separated from the lower side walls while the mass is still sustained by the upper side walls, thereby permitting the lower surfaces of the mass to be reheated from the interior of the mass before the latter is discharged from the receptacle.

7. The combination with a tank to contain molten glass and provided with a bottom opening for the flow of a continuous stream of glass, of a receptacle below and in register with said opening to temporarily receive the glass and collect it into masses to be discharged into suitable molds, said receptacle having a bottom opening for the discharge of the mass, the side walls of the receptacle being inclined upwardly and outwardly from an intermediate point so that the walls above said point converge downwardly, the convergency terminating at said point, a bottom beneath said bottom opening of the receptacle to support and retain the glass within the receptacle during the initial accumulation of the mass therein, means to withdraw said bottom and leave the mass supported by the said inclined walls, and means to discharge the mass a predetermined time interval after the bottom has been withdrawn.

8. The combination of means for supporting a mass of molten glass, comprising lateral and bottom supporting surfaces, and means to withdraw said bottom surface and leave the glass supported by said lateral surfaces, the latter formed to temporarily sustain the weight of the glass, and means to withdraw the lateral surfaces and thereby permit the glass to drop by gravity.

9. The combination of a device having supporting surfaces arranged to support and shape a solid mass of molten glass by engagement with the lateral surfaces of the mass, the bottom of the mass being unsupported so that the weight of the mass is sustained by said supporting surfaces, and means to release said mass and drop it before it has hardened sufficiently to retain the shape imparted to it by said supporting surfaces.

10. Means for segregating a flowing stream of glass into individual masses or gathers, comprising a bottom support arranged to arrest the flowing stream, lateral supporting walls for the accumulating mass, and means for withdrawing said bottom support and leaving the mass temporarily supported by the lateral walls so that the bottom surface of the mass cooled by contact with said bottom, will be reheated from the interior of the mass, said walls arranged to sustain the weight of the mass and prevent it from dropping during said reheating.

11. Means for segregating a flowing stream of glass into individual masses or gathers, comprising a bottom support arranged to arrest the flowing stream, lateral supporting walls for the accumulating mass, means for withdrawing said bottom support and leaving the mass temporarily supported by the lateral walls so that the bottom surface of the mass cooled by contact with said bottom, will be reheated from the interior of the mass, said walls arranged to sustain the weight of the mass and prevent it from dropping during said reheating, and timed mechanism to withdraw the lateral walls to release the mass after said reheating.

12. Means for segregating a flowing stream of glass into individual masses or gathers, comprising a bottom support arranged to arrest the flowing stream, upwardly and outwardly inclined lateral supporting walls for the accumulating mass, and means for withdrawing said bottom support and leaving the mass temporarily supported by the lateral walls so that the bottom surface of the mass cooled by contact with said bottom, will be reheated from the interior of the mass, and automatic means to cause the release of the mass from said walls a predetermined time interval after the bottom support is withdrawn.

13. The combination with means for establishing a flowing stream of glass, of means providing a conduit or passageway through which the glass flows, said conduit being of considerably greater cross sectional area than the stream flowing therethrough, a device for interrupting the flow and causing the glass to accumulate within said conduit, and means to withdraw said interrupting device to release the accumulated mass, said conduit above said arresting device being so formed that the mass is temporarily supported thereby after said arresting device is withdrawn, permitting the surface of the mass, cooled by contact with said arresting device, to be reheated from the interior of the mass.

14. In glass flowing mechanism, the combination with means for establishing a stream of glass, of means providing a conduit or passageway through which the glass flows, a device movable transversely across said passageway while the glass is flowing therethrough for arresting the flow and severing the stream into individual masses, said conduit being narrowed or restricted adjacent said arresting device sufficiently to cause the mass of accumulated glass in the conduit to be temporarily supported by the walls of the conduit when said device has been withdrawn, and timed mechanism for actuating said arresting device.

15. In a glass flowing mechanism, the combination with means for establishing a stream of molten glass, of a receptacle in which the glass is accumulated, said receptacle comprising separable sections and a removable bottom, a cam, means actuated thereby to separate said sections, a second cam, means actuated thereby to operate said bottom, said cams timed to first withdraw said bottom, and after a predetermined time interval to separate said sections, the receptacle being formed to temporarily support the mass after said bottom has been withdrawn, to thereby permit the bottom surface of the mass, which has been cooled by contact with said bottom, to be reheated from the interior of the mass before the first mentioned cam operates to separate said sections and release the accumulated mass.

16. The combination with means for flowing glass, of a receptacle positioned below said means to receive the flow of glass and having a removable bottom to provide a discharge opening, the inner diameter of the receptacle being restricted at a point intermediate its top and bottom, means to withdraw said bottom when the level of the glass in the receptacle reaches a point above said restriction, the latter being sufficient to cause the mass to be temporarily supported, independently of said bottom, the walls of the receptacle below said restriction being so formed that the glass will draw away therefrom while thus supported.

17. In glass flowing apparatus, the combination with an open bottomed sectional cup, of a bottom therefor arranged to swing into and out of position beneath said cup, arms mounted to swing about a vertical axis and carrying the cup sections, a driveshaft, cams thereon, one cam arranged to swing said arms for opening or closing the cup sections, the other cam arranged to swing said bottom into or out of operative position, said cams timed to swing the bottom out of operative position a predetermined time interval before the cup sections are separated to drop the gather, the cup sections being formed to support the plastic glass and prevent it from dropping from the cup during said time interval.

18. The method of manipulating glass, which consists in establishing a flowing stream, arresting said stream and causing the glass to accumulate, supporting the accumulating mass by the lateral surfaces thereof while the bottom portion of the mass is unsupported and permitted to draw downward, and then releasing said mass.

19. The method of manipulating glass, which consists in establishing a flowing stream of molten glass, providing a bottom support to arrest the stream and lateral supports for the accumulating mass, and withdrawing the bottom support and causing the mass to be sustained temporarily by the lateral supports while the bottom surface of the mass, cooled by said bottom support, is reheated from the interior of the mass.

20. The method of segregating a flowing stream of molten glass into masses and delivering them to molds, which consists in arresting the stream and causing the glass to accumulate into a mass, temporarily supporting said mass by the lateral surfaces or walls thereof, causing the mass to slowly draw downward while thus supported, and then releasing the mass and disconnecting it from the flowing stream and permitting it to drop into a mold.

21. The method of manipulating glass, which consists in separating a stream of flowing glass into individual masses, supporting said masses at their lateral surfaces while the unsupported bottom surfaces of the masses are elongated downwardly by their weight, and releasing the masses and dropping them.

22. The method of manipulating glass, which consists in establishing a flowing stream of molten glass, providing a bottom support to arrest the stream and lateral supports for the accumulating mass, withdrawing the bottom support and causing the mass to be sustained temporarily by the lateral supports while the bottom surface of the mass, cooled by said bottom support, is reheated from the interior of the mass, releasing said mass from the lateral supports, and disconnecting the mass from the oncoming stream.

23. The method of producing gobs of glass from a flowing stream of molten glass, which consists in arresting and supporting the lower end of the stream and causing it to accumulate to form a gob while supported by a supporting surface, and causing a relative movement of the accumulating gob and supporting surface in a manner to cause the lower portion of the gob to recede from said supporting surface and the area of support to shift upwardly relatively to the gob as the latter accumulates, and separating the gob from the stream.

24. The method of collecting a flowing stream of molten glass to form a vertically elongated mass, which consists in arresting and confining the lower portion of said mass as it accumulates, and then supporting the mass at the upper portion thereof and causing a separation of the lower portion of the mass from its support while the weight of the mass is supported at said upper portion and separating the mass from the stream.

25. The method of producing from a flowing stream of molten glass, a mass of substantially uniform temperature throughout, which consists in providing an obstructing surface to arrest the stream and cause the glass to accumulate, and a supporting surface to support the accumulating mass, and withdrawing said obstructing surface during said accumulation, and causing the surface of the glass, cooled by contact with said obstructing surface, to be reheated during said accumulation.

26. The method of producing a charge of glass from a flowing stream of molten glass, which consists in interposing a bottom support to arrest the stream providing lateral walls to confine the accumulating mass, and withdrawing the bottom support and causing the lower portion of the mass to withdraw from the lateral walls and its surface to become reheated while the upper portion of the mass is accumulating and supported by said walls.

27. The method of manipulating glass, which consists in flowing glass into an open ended receptacle to accumulate a charge, forming a dam of glass in the receptacle by first obstructing the outlet while the dam is accumulating, withdrawing the obstruction and continuing the accumulation within the receptacle to complete the charge, and then discharging and cutting off the charge.

28. The method of manipulating glass which consists in first arresting a flowing stream of glass to partially form a gob, then while arresting the side portions of the partially formed gob, to flow molten glass therethrough, at the same time accumulating more of the flow at the top until the desired size of gob is formed, then releasing the gob and cutting it from the stream.

29. The method of gob-feeding from a flowing stream of molten glass, consisting in arresting the end of the stream to first partially form a gob, then while the remainder of the gob is accumulating from the stream, to reheat the first portion by flowing a portion of the molten glass centrally through the first accumulated portion, then feeding the completed gob to the shaping device 30. The method of feeding glass gobs, consisting in flowing molten glass, arresting the stream long enough to partially form a gob, then elongating the lower end of the gob at the same time accumulating more glass at the top until the desired quantity is accumulated to complete the gob, and then in releasing and feeding the gob.

31. The method of producing a formed mass of glass from a flowing stream, which consists in retarding the flow to accumulate an initial portion of the mass, and building up the mass on both sides of said initial portion by causing a downward flow of the glass through and beyond said initial portion while the glass accumulates above said initial portion.

32. The method of segregating a stream of glass into formed masses, which consists in flowing the glass into a former, causing the glass to protrude from the former while the weight of the mass is supported by the former, releasing the mass, and separating it from the stream.

33. The method of manipulating a flowing stream of glass to produce a mass, which consists in arresting the stream to commence the accumulation of the mass, and causing a continued flow or movement of the accumulating glass through the interior of and beyond the accumulated portion of the mass, thereby extending the mass beyond said first accumulated portion thereof.

34. In combination with a glass-furnace having an orifice for emitting a stream of molten glass; a two-part receptacle below and in close operative relation to the orifice of said furnace, which two-part receptacle, when closed, has an opening therethrough registering with the orifice of said furnace, and said opening being contracted in diameter downwardly to a point in the lower half thereof and from said point to the lower end of said opening, being expanded in diameter sufficiently to permit the glass to separate from contact with the lower walls of said receptacle while supported by said contracted portion of the receptacle, the two parts of said receptacle being reciprocable to and from each other; means for reciprocating said two parts of said receptacle; a reciprocable cut-off member below and in close operative relation to said two-part receptacle; means for reciprocating said cut-off member and said two-part receptacle in synchronism with the step-by-step rotation of a mold-table carrying molds to receive gathers of glass from said two-part receptacle.

35. The method of forming an elongated gob with an end of reduced diameter, which consists in flowing the glass into a forming receptacle having a restricted end opening, causing the glass to protrude slowly through said opening and thereby form a reduced end on the gob while the weight of the gob is supported in the receptacle, and then discharging the gob.

36. The method of forming an elongated gob, which consists in flowing a stream of glass into a forming receptacle having an elongated cavity with downwardly and inwardly tapered walls, causing a portion of the glass to protrude through a bottom opening in the receptacle and thereby form an end on the gob of reduced diameter, while the weight of the gob is supported by said tapered walls discharging the gob, and severing it from the stream.

37. The method which consists in flowing glass into a forming receptacle shaped to form an elongated gob and having a restricted opening, causing the glass to protrude through said opening and thereby form a reduced end on the gob, and then dropping the gob from said receptacle into a mold having a reduced neck mold section and causing said reduced end of the gob to enter said neck mold section.

Signed at Evansville, in the county of Vanderburg and State of Indiana, this 7th day of June, 1917.

JOSEPH B. GRAHAM.